United States Patent [19]
Chevrette et al.

[11] Patent Number: 6,022,027
[45] Date of Patent: Feb. 8, 2000

[54] VARIABLE CLEARANCE PACKING RING WITH CLIPS FOR PREVENTING CIRCUMFERENTIAL DISPLACEMENT

[75] Inventors: Richard Jon Chevrette, Cohoes; David Robert Skinner, Pattersonville; Victor John Knorowski, Rexford, all of N.Y.

[73] Assignee: General Electric Co., Schenectady, N.Y.

[21] Appl. No.: 08/993,367

[22] Filed: Dec. 18, 1997

[51] Int. Cl.[7] .................................................. F16J 15/447
[52] U.S. Cl. ........................... 277/413; 277/416; 277/422
[58] Field of Search .................................. 277/413, 416, 277/421, 422

[56] References Cited

U.S. PATENT DOCUMENTS

| | | | |
|---|---|---|---|
| 2,239,637 | 4/1941 | Zesewitz | 277/416 |
| 2,600,991 | 6/1952 | Hargrove | 277/416 |
| 3,155,395 | 11/1964 | Hoffman | 277/416 |
| 3,594,010 | 7/1971 | Warth | 277/413 |
| 3,642,292 | 2/1972 | Dougherty | 277/347 |
| 4,436,311 | 3/1984 | Brandon | 277/413 |
| 5,374,068 | 12/1994 | Jewett et al. | 277/303 |
| 5,395,124 | 3/1995 | Brandon | 277/413 |
| 5,464,226 | 11/1995 | Dalton | 277/412 |
| 5,487,491 | 1/1996 | Smith et al. | 222/95 |
| 5,487,549 | 1/1996 | Dalton et al. | 277/413 |
| 5,509,780 | 4/1996 | Synfelt | 277/413 X |
| 5,709,388 | 1/1998 | Skinner et al. | 277/412 |

FOREIGN PATENT DOCUMENTS

277806   6/1927   United Kingdom .

*Primary Examiner*—Anthony Knight
*Assistant Examiner*—Karlena D. Schwing
*Attorney, Agent, or Firm*—Nixon & Vanderhye

[57] ABSTRACT

A rotary machine has a stationary component with circumferential grooves and a rotatable component, as well as annular sealing segments movable toward and away from the rotating component. To prevent circumferential displacement of the lower side annular segments by gravity forces and enable the lowermost segment in the lower housing to be moved radially inwardly, the side segments of the lower housing are supported adjacent the casing midline in a manner preventing downward movement and enabling radial inward and outward movement. Generally Z-shaped clips are disposed in the dovetail groove of the stationary component with the tab at the upper end of the clip engaging a stop on the stationary component and the radially inwardly directed tab on the lower end of the clip engaging in a recess of the segment. Consequently, the segment, upon radial inward movement, pivots the clip about an axis adjacent the casing midline, enabling radial inward and outward movement and preventing circumferential displacement.

12 Claims, 6 Drawing Sheets

VARIABLE CLEARANCE PACKING RING WITH CLIPS FOR PREVENTING CIRCUMFERENTIAL DISPLACEMENT

TECHNICAL FIELD

The present invention relates to seals between rotating and stationary components of a rotary machine, such as a steam turbine, and particularly relates to positive pressure, variable clearance packing ring segments having guides for preventing circumferential slippage of the segments about the groove of the stationary component and enabling the segments to move toward and away from the rotating component, i.e., between large and small clearance positions relative to the rotating component.

BACKGROUND

In rotary machines such as turbines, seals are provided between rotating and stationary components. For example, in steam turbines, it is customary to employ a plurality of arcuate seal ring segments to form a labyrinth seal about and between the stationary and rotating components. Typically, the arcuate seal ring segments are disposed in an annular groove in the stationary component concentric about the axis of rotation of the machine and hence concentric to the sealing surface of the rotating component. Each arcuate seal segment carries an arcuate seal face in opposition to the sealing surface of the rotating component. In labyrinth-type seals, the seal faces carry a radially directed array of axially spaced teeth and which teeth are radially spaced from an array of axially spaced annular grooves forming the sealing surface of the rotating component. Alternatively, the rotating component may have a smooth surface in radial opposition to the array of teeth on the seal faces. The sealing function is achieved by creating turbulent flow of a working media, for example, steam, as it passes through the relatively tight clearances within the labyrinth defined by the seal face teeth and the opposing surface of the rotating component.

In a typical installation, the annular groove is dovetail-shaped, having locating flanges directed axially toward one another and defining a slot therebetween. The stationary component (e.g., a housing or casing) is typically split lengthwise along a generally horizontal extending midline defining upper and lower halves of the stationary housing. Thus, the semi-annular dovetail grooves receive portions of the arcuate seal ring segments. The seal ring segments are similarly dovetail-shaped, having a pair of flanges directed axially away from one another for disposition within the dovetail groove and a neck which joins the seal face and the flanges of the segment and passes through the slot defined by the locating flanges of the groove. The neck carries the arcuate seal face radially inwardly of the groove when each segment is installed.

In positive pressure, variable clearance type packing rings, the segments are typically spring biased into outer or large clearance positions with the seal faces carried thereby spaced substantially outwardly of the rotary component. Thus, for example, at startup of the machine, the springs displace the segments radially outwardly. After start-up, the working fluid medium, e.g., steam, is inlet to the grooves of the stationary component, biasing the segments for movement inwardly against the bias of the springs toward the inner or small clearance positions. It will be appreciated that when the segments are retracted to their large clearance positions during startup and turbine shutdown by the springs, the gaps between the end faces of adjoining segments become increasingly greater. Conversely, when the segments are displaced inwardly, the gaps between the end faces of the segments decrease substantially to a fully-closed position when the segments obtain their smallest diameter. To accommodate the inward and outward movement of the segments, the segments are disposed within the grooves of the stationary component in a sliding or piston-fit arrangement.

It has been found that when the rotary machine (e.g., steam turbine) is at rest, for example, prior to startup, the segments, lying in their largest radially outward position, have been observed to slide along the circumferential groove of the stationary component in a downward direction under the action of gravity forces. As a consequence, an accumulation of clearances between the end faces of the segments appears in the upper housing, while the lower segments become closer, i.e., butting end-to-end. For example, where six segments are employed in a rotary machine, three segments are typically disposed in the upper housing of the stationary casing and three segments are disposed in the lower housing, i.e., respectively above and below the horizontal midline or splitline of the machine casing. Prior to startup, the side segments in the upper housing and the side segments of the lower housing may slide under the action of gravity forces such that the side segments of the lower housing engage the lowermost central segment in the lower housing of the machine, with the accumulated clearance between the end faces appearing between the uppermost segment in the upper housing and one or both of the side segments of the upper housing.

Upon startup, the segments are designed to move under fluid pressure from their radially outward positions to their radially inward positions. Because of the effect of gravity, the segments tend to move in sequence. First, the top segment moves radially inwardly, followed by the side segments of the upper housing. The side segments of the lower housing then move radially inwardly, followed by the lowermost segment. It has been found, however, that because the segments become displaced circumferentially about the groove of the stationary component by gravity forces, the inward movement of the side segments of the lower housing of the stationary component, essentially in an upward radial direction, precludes or blocks radial inward movement of the lowermost segment. That is, the fluid pressure forces tending to displace the lowermost segment radially inwardly are insufficient to displace the lower side segments in a generally upward circumferential direction to enable the lowermost segment to move into its radially innermost position. Consequently, the lowermost segment remains radially displaced from its designed radially inward position resulting in a larger than desired clearance between its sealing face and the rotary component.

Previously, attempts have been made to accommodate the gravity forces acting on seal segments. See, for example, U.S. Pat. Nos. 5,464,226 and 5,395,124. In the latter patent, so-called gravity springs are disposed in the stationary component to apply an upward biasing force to the seal segments in the lower housing. These gravity springs engage the seal segments intermediate their ends and at their centers of gravity. The seal segments, moreover, are provided with circumferential springs between the adjoining end faces, as well as between the end faces adjacent the horizontal midline. Anti-rotation keys are fixed to the upper and lower housing at the casing midline, the circumferential springs bearing against the anti-rotation keys. Consequently, the seal segments are biased outwardly by the springs between the segment ends and inwardly by fluid pressure forces. When the seal segments move inwardly, the gravity springs function such that the segments have little or no weight, permitting closure of the lower seal segments to the inner position. Thus, the lower seal segments are said to float by virtue of their opposing circumferential and gravity spring forces and such segments move radially inwardly and outwardly. Also, the end circumferential springs bearing against the anti-rotation keys bias the lower seal segments for circumferential displacement within the grooves in contrast to the present invention wherein circumferential displacement of the lower side segments is positively prevented and horizontal, rather than radial, movement of the lower side segments between inner and outer positions is provided.

In U.S. patent application Ser. No. 08/721,655, filed Sep. 27, 1996, of common assignee herewith, each of the side segments in the lower housing of the casing is provided with a guide which supports the segment, prevents the segment from circumferential displacement under gravity forces, and enables the segment to slide horizontally between outer large and inner small clearance positions, respectively. Each guide comprises an angle bracket, one leg of which is secured to the outer face of the segment adjacent the end of the segment near the midline of the rotary machine. The generally horizontally projecting other leg of the bracket is received in a recess formed in the interior surface of the stationary component and rests on a stop carried by the stationary component. The stops prevent downward circumferential displacement of the side segments in the groove of the lower housing of the rotary machine and thereby maintain clearance between the butt ends of adjacent packing segments. The bracket also supports the side segments of the lower housing of the machine for movement in a generally horizontal direction toward and away from a vertical plane through the axis of the machine. Thus, each side segment moves as a unit horizontally toward and away from the rotary component. By enabling only horizontal displacement of the lower side segments and not radial displacement, the clearances between the rotary component and the seal faces of the lower side segments at opposite ends thereof is slightly different. However, that difference was not sufficient to deleteriously affect the integrity of the labyrinth seal along the lower sides of the machine. Beneficially, however, the prevention of the circumferential displacement of the lower side segments under gravity forces enabled the lowermost segment of the lower housing for displacement radially inwardly, e.g., upwardly, to its designed radially innermost position after startup.

While the guide of the aforementioned co-pending patent application has been found satisfactory, there are applications in which the guide cannot be used to effect the purposes of the guide. For example, in refurbishing and retrofitting diaphragms for steam turbines, and ancillary parts, it has been found that certain turbines have horizontal joint features such as dowel pins or joint keys which would not permit or render impractical the fitting of the guide bracket to the stationary component. Sometimes, the diaphragm web itself would not permit the mounting of the guide bracket as it would interfere with other parts necessary at the joint midline. Moreover, the application of the guide bracket of the aforementioned patent application required substantial machining at the horizontal diaphragm joint, as well as bolting of the guide to the segments. Those procedures and additional parts increase the cost of the installation of the guide brackets. Thus, there is a need of a wholly new retention device to prevent circumferential slippage of the segment and which can be used on both original equipment manufacture as well as retrofits for most, if not all turbines.

DESCRIPTION OF THE PRESENT INVENTION

In accordance with the present invention, a retainer clip is interposed between the stationary component and an associated segment along opposite sides of the lower half of the housing adjacent the horizontal midline joint. The retainer clip essentially comprises an elongated flat arcuate leaf spring having oppositely turned tabs at opposite ends of the spring. A recess is formed in the wall of the stationary component adjacent the horizontal joint at each side of the lower housing for receiving the radially outwardly directed tab at an upper end of the clip. The radially outer face of the upper segments of the lower casing or housing are provided with recesses (extending generally axially) for receiving the radially inwardly directed lower tab at the opposite end of the clip. The clip thus extends in the space between the segment and the stationary component and in the volume which receives steam for displacing the segment radially inwardly when the machine is at operating speed.

When the machine is at rest, and the springs conventionally employed in variable packing ring segments bias the segments to their radially outermost positions, the clips bear against the wall of the stationary component over a substantial portion of their length. When the machine approaches running speed, the segments are displaced inwardly under steam pressure against the bias of the springs to close the sealing gap between the labyrinth teeth and the rotary component. The lower ends of the clips follow the movement of the segments and displace the clip from the wall of the stationary component. However, the dimensions of the tabs and the recesses in which the tabs are located are such as to preclude the clip from becoming loose in the steam volume between the segments and the stationary component, thus retaining the clip captive between the segment and the stationary component. It will be appreciated that by this arrangement, the clip engaging between the upper segments of the lower casing and the stationary component prevent those upper segments from being displaced circumferentially under gravity forces. Hence, when the machine obtains operating speed, the lowermost segment in the lower casing has full clearance between its opposite ends and the lower ends of the upper segments to permit the lower segment full radial inward movement at operating speed. The clip hereof may also be used in the upper casing half to retain the segments along opposite sides of the upper casing and prevent their movement downwardly and out of the upper casing when the upper casing is applied to close the lower casing.

In a preferred embodiment according to the present invention, there is provided a rotary machine having a component rotatable about an axis, comprising a stationary component having an annular groove about the axis, at least one axially directed locating flange about the axis and in part defining a slot opening into the groove, and a stop, a segment body for forming one of a plurality of arcuate segments about the axis of the machine and for partial disposition in the groove of the stationary component, the segment body having an arcuate seal face, at least one axially directed flange for disposition in the groove and a neck portion receivable in the slot and interconnecting the flange and the seal face and an elongated retention clip disposed between the segment body and the stationary component, the clip having a generally radially outwardly extending projection adjacent one end thereof engaging the stop carried by the stationary component and a generally radially inwardly extending projection adjacent an opposite end thereof engaging the segment for preventing circumferential displacement of the segment body about the groove.

In a further preferred embodiment according to the present invention, there is provided a rotary machine having a component rotatable about an axis, comprising an upper casing and a lower casing joined together at a horizontal midline and defining an annular groove about the axis, at least one axially directed locating flange about the axis and in part defining a slot opening into the groove, and a pair of stops located adjacent the midline in the lower casing, a plurality of arcuate segments about the axis of the machine and for partial disposition in the groove of the stationary component, at least three of the segments being disposed in the lower housing defining a pair of side segments and a segment intermediate the side segments, each segment having a body having an arcuate seal face, at least one axially directed flange for disposition in the groove and a neck portion receivable in the slot and interconnecting the flange and the seal face and an elongated retention clip disposed between each side segment bodies and the stationary component, each clip having a generally radially outwardly extending projection adjacent one end thereof, the projections engaging the stops, respectively, carried by the lower casing, each clip also including a generally radially inwardly extending projection adjacent an end thereof opposite the outwardly extending projection, the inwardly extending projections engaging the side segments for preventing circumferential displacement of the segment body about the groove.

Accordingly, it is a primary object of the present invention to provide a novel and improved rotary machine having stationary and rotating components wherein annular seal segments about the stationary component are prevented from circumferential displacement due to gravity forces, thereby enabling the segments to close about the rotary component effecting the seal, rather than binding up and preventing seal closure.

BEST MODE FOR CARRYING OUT THE INVENTION

Figure 1:
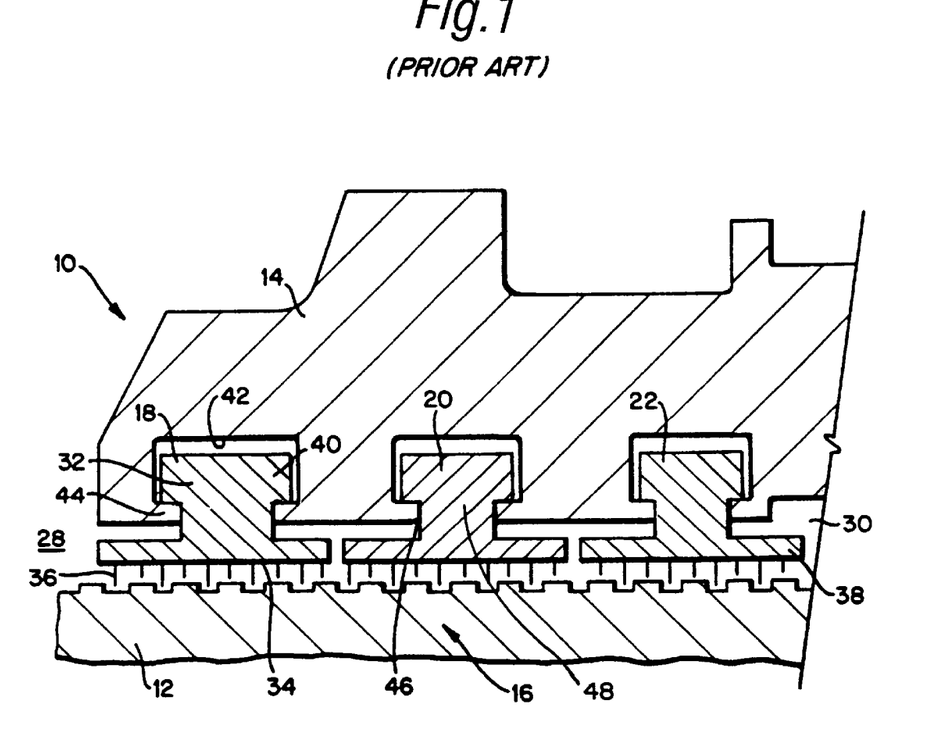
FIG. 1 is a fragmentary cross-sectional view of a portion of a rotary machine, for example, a steam turbine, looking transversely of the axis thereof and illustrating labyrinth seals.

Referring now to drawing FIG. 1, there is illustrated a portion of a rotary machine, for example, a steam turbine, generally designated 10, having a rotary component, e.g., a turbine shaft 12, disposed in a stationary component, e.g., a turbine housing 14 and which shaft 12 is supported for rotation by conventional means, not shown, within turbine housing 14. A multi-stage labyrinth seal 16 including a plurality of seal rings 18, 20 and 22 are disposed about turbine shaft 12, separating high and low pressure regions 28 and 30, respectively. Each seal ring is formed of an annular array of a plurality of arcuate seal segments 32. In general, labyrinth seal 16 functions by placing a relatively large number of partial barriers to the flow of steam from the high pressure region 28 to the low pressure region 30. Each barrier forces steam attempting to flow parallel to the axis of turbine shaft 12 to follow a tortuous path whereby a pressure drop is created. As best illustrated, for example, in FIG. 1, each seal ring segment 32 thus has a sealing face 34 with projecting radial teeth 36. The sealing face 34 is formed by a pair of flanges 38 extending axially away from one another, although it will be appreciated that only one such flange 38 is necessary in certain applications. The outer portions of the seal ring segments 32 include locating hooks or flanges 40 which similarly extend from segment 32 in axially opposite directions away from one another. As illustrated in FIG. 1, the stationary component, i.e., turbine housing 14, has a generally dovetail-shaped annular groove 42 at each axial location of the seal. The annular groove 42 is located along radially innermost portions of the housing 14 by a pair of locating flanges 44 which extend axially toward one another defining a slot 46 therebetween. A neck 48 of each segment 32 interconnects the locating flanges or hooks 40 and the sealing face 34 and extends through the slot 46.

It will be appreciated that the segments 32 preferably comprise positive pressure, variable clearance packing ring segments movable between open outermost large clearance and closed innermost small clearance positions about the rotary component, e.g., the turbine shaft, at startup and at speed, respectively. The segments are moved to their open outermost largest diameter positions by springs disposed between the locating flanges or hooks 40 of the segments and the locating flanges 44 of the stationary component 14. To displace the segments into their closed smaller diameter position, a plurality of passages, not shown, are provided in the stationary component or segments to introduce the flowing medium, for example, steam, in the groove 42 and along the outer face of the segments whereby the segments may be displaced inwardly toward the rotary component against the bias of the springs. This type of positive pressure variable clearance packing ring segment is conventional in the art, for example, as described and illustrated in U.S. Pat. No. 5,374,068 of common assignee herewith, the disclosure of which patent is incorporated herein by reference.

Figure 2:
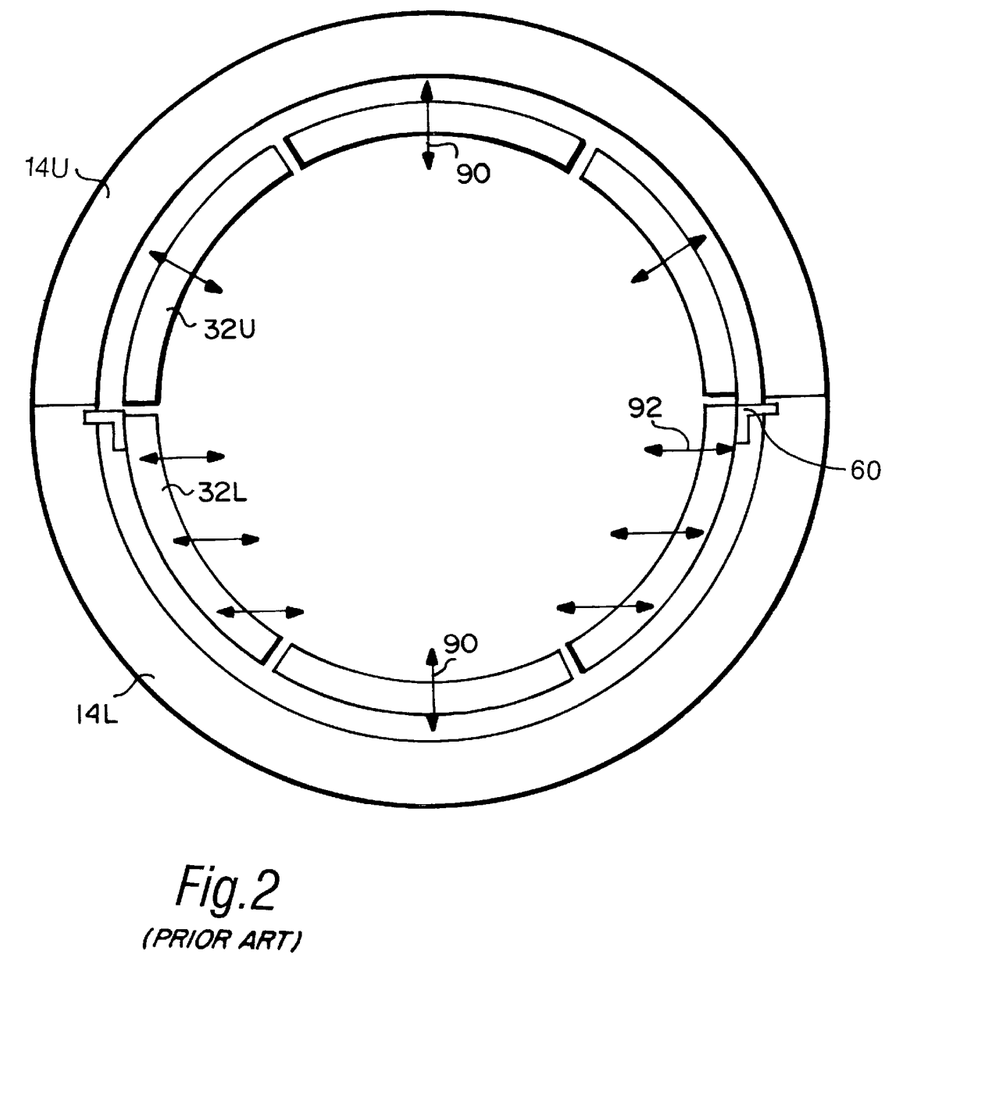
FIG. 2 is a schematic axial view of the guide brackets employed in the aforementioned patent application.

Referring to FIG. 2, which is a schematic illustration of the above-identified U.S. patent application Ser. No. 08/721, 655, of common assignee herewith, the housing 14 is typically divided into upper and lower stationary housing halves 14U and 14L, respectively. Each housing half mounts a plurality of segments, three segments 32U and three segments 32L being shown in each of the upper and lower housing halves 14U and 14L, respectively. In accordance with that prior application, the upper segments 32U are movable radially inwardly and outwardly under steam and spring pressures, respectively. Similarly, the middle segment 32L in the lower housing is likewise movable radially inwardly and outwardly under steam and spring pressures, respectively. The upper pair of segments 32L in the lower housing half, however, are mounted on brackets 60 at their upper ends. Particularly, the lower leg of each bracket 60 is secured, for example, by bolts to the upper end of each of the segments and the horizontal portion of the bracket rests in a slot formed in the lower housing. Consequently, those segments are movable in the direction indicated by the arrows 92. As indicated previously, while this arrangement has proven satisfactory, there are certain rotary machines in which the bracket cannot be inserted or retrofitted and the present invention therefore provides a different form of connection between the stationary component and the radially inwardly and outwardly movable segments to enable all segments to move circumferentially.

Figure 3:
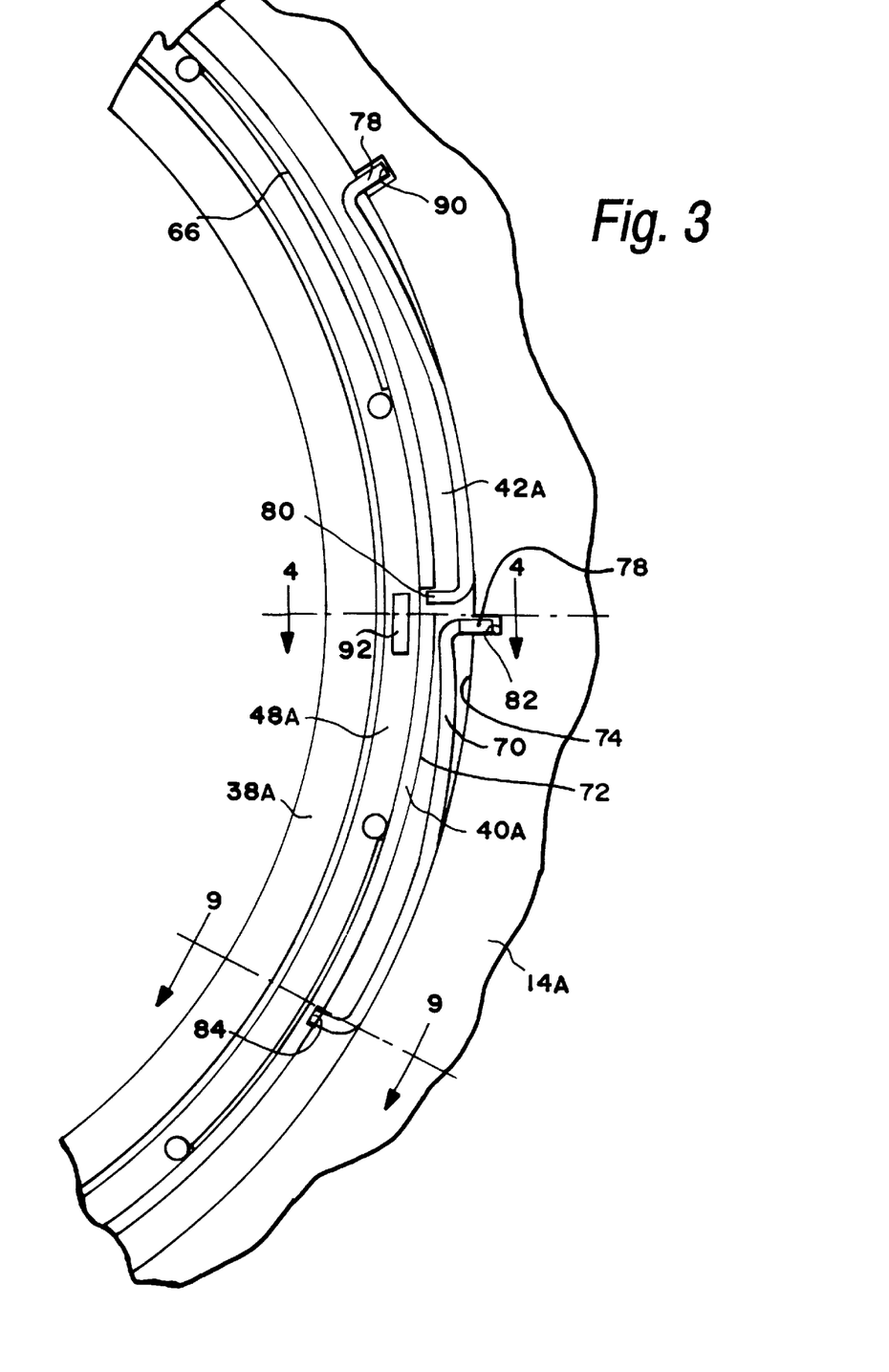
FIG. 3 is an enlarged fragmentary axial view of upper and lower side segments of an upper and lower casing of a turbine illustrating a clip for preventing circumferential movement of the segments in accordance with the present invention.
Figure 4:
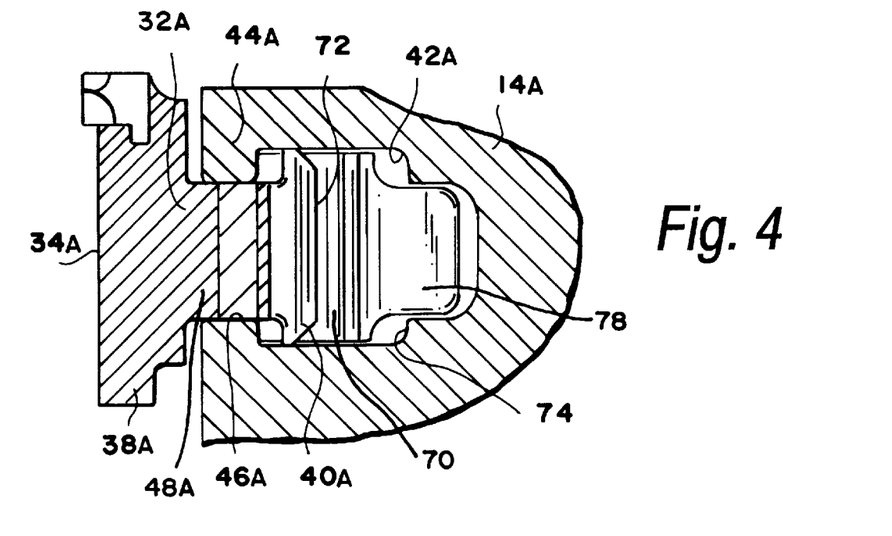
FIG. 4 is a cross-sectional view thereof taken generally about on line 4—4 in FIG. 3.
Figure 5:
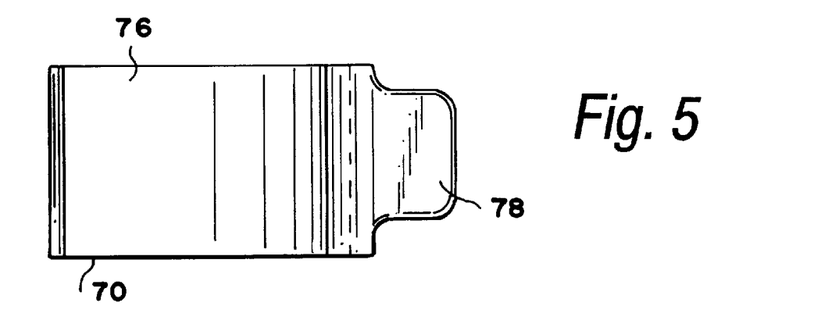
FIG. 5 is a top plan view of a spring clip according to the present invention.
Figure 6:
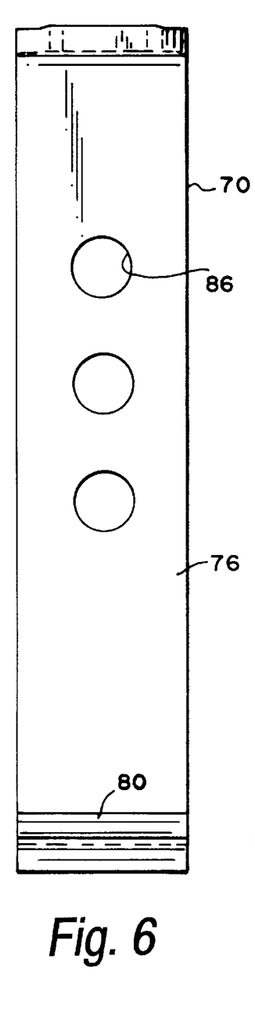
FIG. 6 is an elevational view of the spring clip hereof looking radially outwardly.
Figures 7, 8:
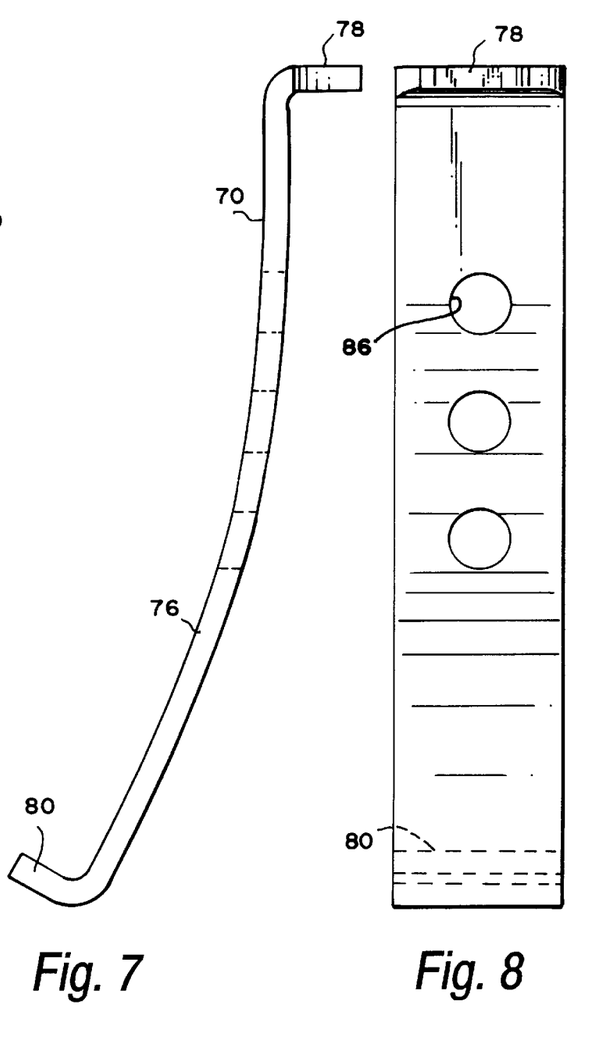
FIG. 7 is a side elevational view thereof.
FIG. 8 is an elevational view of the spring clip hereof looking radially inwardly.
Figure 9:
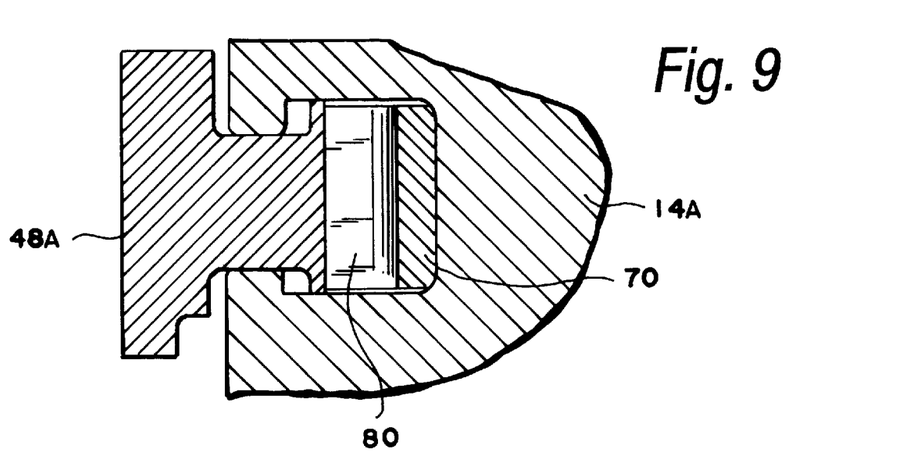
FIG. 9 is a cross-sectional view taken generally about on lines 9—9 in FIG. 3.

Particularly, and referring to FIGS. 3 and 4, there is provided a stationary component 14A defining a generally dovetail-shaped groove 42A with locating flanges 44A axially spaced one from the other. Each segment 32A includes a sealing face 34A which mounts the labyrinth teeth, seal face flanges 38A and locating hooks or flanges 40A, the locating hooks or flanges 40A and seal face flanges 38A being interconnected by a reduced neck 48A disposed between the opposed faces 46A of the locating flanges 44A. As best seen in FIG. 3, and in accordance with the disclosure of U.S. Pat. No. 4,374,068, of common assignee herewith, springs 66 are disposed between the locating flanges 40A of the segments 32A and the locating flanges 44A of the stationary component 14A to bias the segments 32A in a radial outward position. Thus, steam introduced into the grooves 42A along the outer face of the segments causes the segments to be displaced radially inwardly toward the rotary component against the bias of springs 66. In order to permit the generally radial inward and outward movement of the side pair of segments in the lower housing 14L, while simultaneously preventing gravity forces from circumferentially displacing the segments 32A in a downward direction, spring clips 70 are provided in accordance with the present invention. Particularly, the spring clips are provided in the arcuate space between the radial outer face 72 of the segments 32A and the radial inner face 74 of the dovetail-shaped groove 42A of the stationary component 14A, respectively. As illustrated in FIG. 3, the clips 70 extend partially circumferentially from, for example, adjacent the horizontal midline of the upper and lower casings 14U and 14L to approximately one-half the circumferential extent of the side segments 32A. Consequently, if six segments are employed, each segment extends 60° and clips extend approximately 30° from the horizontal midline downwardly to approximately a medial portion of the side segments of the lower casing half.

As can be seen, the clips 70 are in a generally Z-shaped configuration with the elongated body 76 between the tabs or projections 78 and 80 at the upper and lower ends, respectively, of the clip. As illustrated in FIG. 3, the lower casing half has a recess or stop 82 formed along its inner face 42A for receiving the tab 78, while the outer face 72 of the side segment has a recess 84 for receiving the lower tab 80.

More particularly, and with references to FIGS. 5–8, the upper tab 78 of the clip has a reduced width inasmuch as a full-width tab is not necessary for engagement with the stop 82. Thus, by reducing the width of the tab, machining, e.g., in retrofits, to form the stop 82 in the lower casing half is minimized. The lower tab 80, however, extends the full width of the clip 70. For reasons which will become clear from the description of the operation of the device, the clips are provided with at least one, and preferably a plurality of openings 86 in the arcuate portion 76.

Referring to FIG. 3, with the tab 78 resting on stop 82 and the tab 80 engaged in the recess 84 formed along the outer face 72 of the segment 72A, it will be appreciated that the segment 32A is prevented from circumferential downward displacement in the dovetail groove 42A under gravity forces. The segment 32A in FIG. 3 is illustrated in its radial outermost position. When the rotary machine comes up to speed, the steam supplied into the groove 42A causes the segments to displace radially inwardly against the bias of springs 66. This radial inward movement of the upper segments of the lower casing half 14L essentially pivots the clips 70 about the engagement between tab 78 and stop 82, displacing the arcuate body portion 76 previously engaged with the face 74 of the groove 42A radially inwardly of face 74. However, because the extent of the tab 80 is greater than the combined extent of the radial movement and the depth of the slot 84, the tab 80 cannot withdraw from the slot upon radial inward movement of the segment 32A. Consequently, the clips 70 maintain the upper side segments of the lower casing half in proper circumferential position, maintaining the clearance between the opposed ends of the lower segment in the lower casing and the lower ends of the side segments of the lower casing, enabling the lower segment to be displaced radially inwardly under steam pressure against the bias of the springs 66. The openings 86 facilitate equalization of the steam pressure on opposite sides of the clip such that the steam pressure is equally distributed along the length of the segments for displacing the segments radially inwardly.

As also illustrated in FIG. 3, a similar pair of spring clips may be provided in the upper half of the casing to prevent circumferential displacement of the side segments thereof. The tabs 78 of the upper clips engage in a similar recess 90 formed in the groove 42A of the stationary component, while the lower tab 80 engages an end face of the locating flanges 40A adjacent the horizontal joint line and the key 92 joining the upper and lower segments across the midline. Thus, when the upper casing is removed for maintenance or repair, the segments do not fall out of the upper casing half under gravity forces but, rather, are retained therewith.

Figure 10:
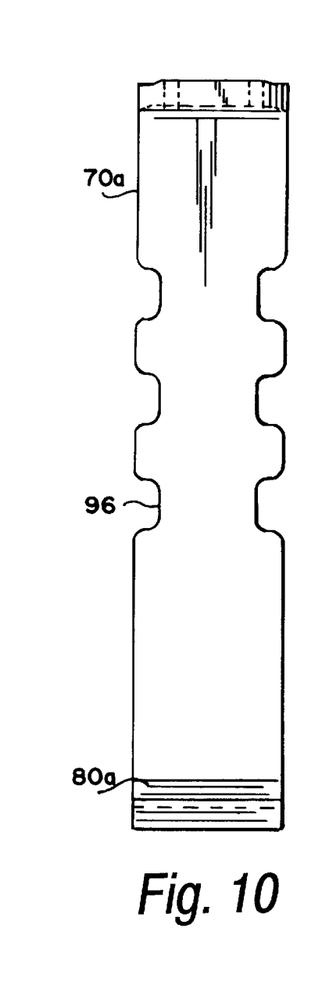
FIGS. 10–12 are views similar to FIGS. 6–8, respectively, and illustrate a further form of spring clip.
Figure 11:
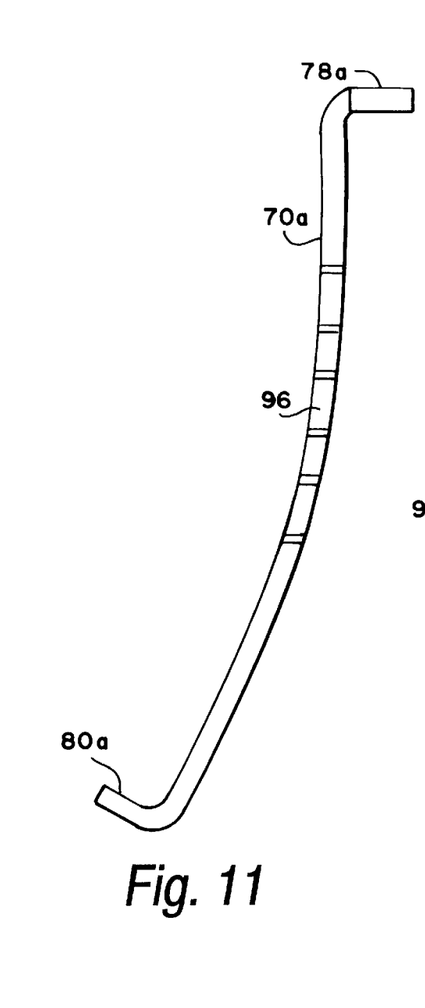
Figure 12:
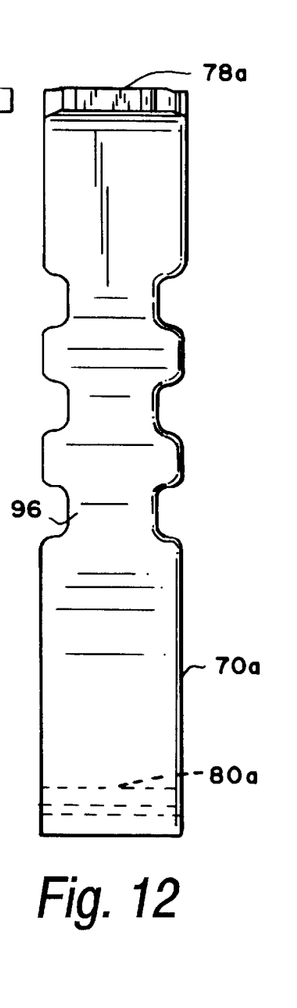

Referring to FIGS. 10, 11 and 12, there is illustrated a further form of spring clip wherein like reference numerals are applied to like parts as in the prior form, followed by the suffix "a." In this form, the spring clips 70a are substantially identical in shape to the spring clip 70 of the prior form with the exception of openings 86. In this form, recesses 96 are formed along one or both sides of the body of the spring clip between the tabs or projections 78a and 80a. Preferably, a plurality of recesses 96 are formed at spaced positions along the spring clip, although it will be appreciated that a single elongated recess may be provided along one or both side edges of the spring clip 70a. The purpose of the recesses 96, however, is similar to the openings 86, i.e., to facilitate equalization of steam pressure on opposite sides of the clip 70a so that the steam pressure is equally distributed along the length of the segments for displacing the segments radially inwardly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary machine having a component rotatable about an axis, comprising:

a stationary component having an annular groove about the axis, at least one axially directed locating flange about the axis and in part defining a slot opening into the groove, and a stop;

a segment body for forming one of a plurality of arcuate segments about the axis of the machine and for partial disposition in the groove of said stationary component;

said segment body having an arcuate seal face, at least one axially directed flange for disposition in the groove and a neck portion receivable in said slot and interconnecting said flange and said seal face, said segments being movable in said groove between radially inner and outer positions relative to said stationary component;

an elongated retention clip disposed between said segment body and said stationary component, said clip having a generally radially outwardly extending projection adjacent one end thereof engaging said stop carried by the stationary component and a generally radially inwardly extending projection adjacent an opposite end thereof engaging said segment for supporting said segment body preventing circumferential downward displacement of the segment body about the groove under gravity forces; and said segment body including an arcuate outward face in said groove and in opposition to an arcuate radial inward face of said stationary component in said groove, said clip including an arcuately extending body between opposite end projections thereof for extending in said annular groove about said axis, said clip being substantially rigid between said opposite end projections, said clip body extending arcuately and lying radially between said segment body face and said stationary component face.

2. A machine according to claim 1 wherein said segment body includes a recess for receiving said radial inwardly extending projection at said opposite end of said clip.

3. A machine according to claim 1 wherein said segment is movable in said groove between radially inward and outward locations relative to said stationary component, said clip including an arcuately extending body between opposite end projections thereof for extending in said annular groove about said axis, said segment including an arcuate radial outward face in said groove and in opposition to an arcuate radial inward face of said stationary component in said groove, said clip body extending arcuately between said segment face and said stationary component face and engaging in part said radial inward face of said stationary component when said segment lies in said radial outward location.

4. A rotary machine having a component rotatable about an axis, comprising:

a n upper casing and a lower casing joined together at a horizontal midline and defining an annular groove about the axis, at least one axially directed locating flange about the axis and in part defining a slot opening into the groove, and a pair of stops located adjacent said midline in said lower casing;

a plurality of arcuate segments about the axis of the machine and for partial disposition in the groove of said stationary component, at least three of said segments being disposed in said lower casing defining a pair of side segments and a segment intermediate said side segments;

each said segment having a body having an arcuate seal face, at least one axially directed flange for disposition in the groove and a neck portion receivable in said slot and interconnecting said flange and said seal face, said segments being movable in said groove between radially inner and outer positions relative to the axis; and an elongated retention clip disposed between each said side segment body and said lower casing, each said clip having a generally radially outwardly extending projection adjacent one end thereof, said projections engaging said stops, respectively, carried by said lower casing, each said clip also including a generally radially inwardly extending projection adjacent an end thereof opposite said outwardly extending projection, said inwardly extending projections engaging said side segments for supporting said side segments and preventing circumferential downward displacement of said side segments about the groove.

5. A machine according to claim 4 wherein each said clip includes an arcuately extending body between opposite end projections thereof for extending in said annular groove about said axis.

6. A machine according to claim 5 wherein each said segment includes an arcuate radial outward face in said groove and in opposition to an arcuate radial inward face of said stationary component in said groove, said clip bodies extending arcuately between said segment faces of said side segments and said lower casing.

7. A machine according to claim 4 wherein each said side segment includes a recess for receiving one of said radial inwardly extending projections of said clip.

8. A machine according to claim 4 wherein said clips each include an arcuately extending body between opposite end projections thereof for extending in said annular groove about said axis, each said side segment including an arcuate radial outward face in said groove and in opposition to an arcuate radial inward face of said lower casing in said groove, each said clip body extending arcuately between said segment face of a side segment and said lower casing face and engaging in part said radial inward face of said lower casing when said side segments lie in said radial outward positions.

9. A machine according to claim 4 wherein each said side segment includes an arcuate radial outward face in said groove and in opposition to an arcuate radial inward face of said lower casing in said groove, each said clip body extending arcuately between said segment face of a side segment and said lower casing face, each said clip body having at least one opening therethrough between opposite sides thereof.

10. A machine according to claim 4 wherein each said side segment includes an arcuate radial outward face in said groove and in opposition to an arcuate radial inward face of said lower casing in said groove, each said clip body extending arcuately between said segment face of a side segment and said lower casing face, each said clip body having at least one recess along an edge thereof between opposite sides of the clip body.

11. A rotary machine having a component rotatable about an axis, comprising:

a stationary component having an annular groove about the axis, at least one axially directed locating flange about the axis and in part defining a slot opening into the groove, and a stop;

a segment body for forming one of a plurality of arcuate segments about the axis of the machine and for partial disposition in the groove of said stationary component;

said segment body having an arcuate seal face, at least one axially directed flange for disposition in the groove and a neck portion receivable in said slot and interconnecting said flange and said seal face, said segments being movable in said groove between radially inner and outer positions relative to said stationary component;

an elongated retention clip disposed between said segment body and said stationary component, said clip having a generally radially outwardly extending projection adjacent one end thereof engaging said stop carried by the stationary component and a generally radially inwardly extending projection adjacent an opposite end thereof engaging said segment for supporting said segment body preventing circumferential downward displacement of the segment body about the groove under gravity forces; and said segment body including an arcuate radial outward face in said groove and in opposition to an arcuate radial inward face of said stationary component in said groove, said clip body extending arcuately between said body segment face and said stationary component face, said clip body having at least one opening therethrough between opposite sides thereof.

12. A rotary machine having a component rotatable about an axis, comprising:

a stationary component having an annular groove about the axis, at least one axially directed locating flange about the axis and in part defining a slot opening into the groove, and a stop;

a segment body for forming one of a plurality of arcuate segments about the axis of the machine and for partial disposition in the groove of said stationary component;

said segment body having an arcuate seal face, at least one axially directed flange for disposition in the groove and a neck portion receivable in said slot and interconnecting said flange and said seal face, said segments being movable in said groove between radially inner and outer positions relative to said stationary component;

an elongated retention clip disposed between said segment body and said stationary component, said clip having a generally radially outwardly extending projection adjacent one end thereof engaging said stop carried by the stationary component and a generally radially inwardly extending projection adjacent an opposite end thereof engaging said segment for supporting said segment body preventing circumferential downward displacement of the segment body about the groove under gravity forces; and said segment body including an arcuate radial outward face in said groove and in opposition to an arcuate radial inward face of said stationary component in said groove, said clip body extending arcuately between said body segment face and said stationary component face, said clip body having a recess along one edge thereof.

\* \* \* \* \*